United States Patent [19]

Beall et al.

[11] Patent Number: 4,940,677

[45] Date of Patent: Jul. 10, 1990

[54] ZINC-CONTAINING PHOSPHATE GLASSES

[75] Inventors: George H. Beall, Big Flats; Candace J. Quinn, Corning, both of N.Y.

[73] Assignee: Corning Incorporated, Corning, N.Y.

[21] Appl. No.: 456,550

[22] Filed: Dec. 26, 1989

Related U.S. Application Data

[63] Continuation-in-part of Ser. No. 258,675, Oct. 17, 1988, abandoned.

[51] Int. Cl.$^5$ .......................... C03C 3/16; C03C 3/17; C03C 3/19; C03C 3/247
[52] U.S. Cl. ...................................... 501/45; 501/44; 501/47; 501/48
[58] Field of Search .................. 501/44, 45, 47, 48, 501/73

[56] References Cited

U.S. PATENT DOCUMENTS

| | | | |
|---|---|---|---|
| 3,215,543 | 11/1965 | Bre | 501/32 |
| 3,248,234 | 4/1966 | Godron | 501/47 |
| 3,979,322 | 9/1976 | Alexeeu et al. | 501/47 |
| 4,439,530 | 3/1984 | Tajima | 501/47 |
| 4,544,974 | 10/1985 | West, Jr. et al. | 501/47 |

*Primary Examiner*—Mark L. Bell
*Attorney, Agent, or Firm*—Clinton S. Janes, Jr.

[57] ABSTRACT

This invention is directed to the preparation of glasses exhibiting a transition temperature below 450° C., a working temperature below 500° C., and excellent resistance to attack by water and mild aqueous alkaline solutions. The glasses consist essentially, in mole percent, of at least 65% total of 23–55% ZnO, 28–40% $P_2O_5$, and 10–35% $R_2O$, wherein $R_2O$ consists of at least two alkali metal oxides in the indicated proportions selected from the group consisting of 0–25% $Li_2O$, 0–25% $Na_2O$, and 0–25% $K_2O$, and up to 35% total of optional ingredients in the indicated proportions selected from the group consisting of 0–6% $Al_2O_3$, 0–8% $B_2O_3$, 0–8% $Al_2O_3+B_2O_3$, 0–15% $Cu_2O$, 0–5% F, 0–35% PbO, 0–35% SnO, 0–35% PbO+SnO, 0–5% $ZrO_2$, 0–4% $SiO_2$, and 0–15% MgO+CaO+SrO+BaO+MnO, consisting of 0–10% MgO, 0–10% CaO, 0–10% SrO, 0–12% BaO, and 0–10% MnO.

8 Claims, No Drawings

ZINC-CONTAINING PHOSPHATE GLASSES

This application is a Continuation-In-Part of application Ser. No. 07/258,675, filed Oct. 17, 1988, now abandoned.

Related Applications

U.S. application Ser. No. 07/258,674, filed concurrently with the predecessor of the present application by us under the title $R_2O-Al_2O_3/B_2O_3-P_2O_5$ GLASSES, discloses the formulation of glasses consisting essentially, in mole percent, of 4–10% $Al_2O_3+B_2O_3$, consisting of 0–7% $Al_2O_3$ and 0–10% $B_2O_3$, 10–45% $Na_2O+Li_2O$, consisting of 10–30% $Na_2O$ and 0–30% $Li_2O$, 10–30% $Li_2O+Cu_2O$, consisting of 0–20% $Cu_2O$ and 0–30% $Li_2O$, and 44–58% $P_2O_5$.

U.S. application Ser. No. 07/258,673, now U.S. Pat. No. 4,874,724, filed concurrently with the predecessor of the present application by G. H. Beall, J. E. Pierson, and C. J. Quinn under the title ALKALI ZINC ALUMINOPHOSPHATE GLASS-CERAMICS, discloses the production of glass-ceramics consisting essentially, in mole percent, of 5–25% $R_2O$, wherein $R_2O$ consists of 5–25% $Li_2O$, 0–15% $Na_2O$, and 0–15% $K_2O$, 35–50% ZnO, 0.75–6% $Al_2O_3$, and 29–37% $P_2O_5$.

Background of the Invention

Research has been continuous to develop inorganic glasses exhibiting low transformation or transition temperatures (Tg), thereby making it possible to conduct melting and forming operations at low temperatures. Inasmuch as glass compositions wherein silica comprises the primary network or glass forming component customarily manifest transition temperatures considerably in excess of 450° C. with forming temperatures greater than 800° C., the desire for glass compositions displaying low transition temperatures has typically resulted in the use of $B_2O_3$ and/or $P_2O_5$ as the principal network forming constituent. U.S. Pat. No. 3,732,181 discloses three general areas of glass compositions, wherein $P_2O_5$ is the principal glass former, which exhibit transition temperatures within the interval of 100°–400° C.:

(a) 20–80 mole % $PbO+P_2O_5 \geq 95$ mole %

(b) 5–60 mole % $PbO+5–35$ mole % $R_2O+$up to 85 mole % $P_2O_5 \geq 95$ mole %

(c) 5–30 mole % $PbO+5–30$ mole % $R_2O+5–20$ mole % $B_2O_3 +15–85$ mole % $P_2O_5 \geq 95$ mole %.

It is stated that ZnO may replace part or all of the PbO.

Unfortunately, phosphate-based glasses typically exhibit poorer chemical durability than silica-based glasses, and that characteristic commonly becomes more pronounced as the transition temperature of the glass becomes lower. Thus, the known low melting phosphate glasses are frequently readily attacked by boiling water and, in extreme instances, manifest hygroscopic behavior. As conventionally defined, the transition temperature of a glass is that temperature at which increases in specific heat and thermal expansion coefficient take place which are accompanied by a sharp drop in viscosity.

Accordingly, the primary objective of the present invention was to develop glasses exhibiting transition temperatures below 450° C., preferably below 350° C., with working temperatures (temperatures at which the glass demonstrates a viscosity of about $10^4$–$10^7$ poises) below 500° C., preferably between about 350°–450° C., which glasses display exceptional chemical durability when contacted with boiling water and mild aqueous alkaline solutions.

Summary of the Invention

That objective can be achieved in glasses having compositions within a specifically-defined region of the $R_2O-ZnO-P_2O_5$ system, wherein $R_2O$ consists of $Li_2O$, $Na_2O$, and/or $K_2O$, and wherein PbO and/or SnO can replace a portion of the ZnO content. Hence, because PbO and/or SnO can be substituted for ZnO in amounts up to 35 mole percent, the broad composition area operable in the present invention consists essentially, expressed in terms of mole percent on the oxide basis, of 10–35% $R_2O$, wherein $R_2O$ consists of at least two alkali metal oxides in the indicated proportions of 0–25% $Li_2O$, 0–25% $Na_2O$, and 0–25% $K_2O$, 23–55% ZnO, 28–40% $P_2O_5$, and, optionally, up to 35% RO, wherein RO consists of 0–35% PbO and 0–35% SnO. The inclusion of at least two alkali metal oxides has been found necessary since laboratory experience has indicated that the presence of $Li_2O$ alone hazards devitrification in the glass, $Na_2O$ alone renders the glass insufficiently durable or too difficult to melt, and $K_2O$ alone raises the Tg of the glass too high. In the preferred glasses $R_2O$ is present in an amount of 10–30% consisting of 3–12% $Li_2O$, 4–18% $Na_2O$, and 0–12% $K_2O$. ZnO is preferably included at a level of at least 30%, $P_2O_5$ ranges about 30–38%, and PbO and SnO will each be limited to a maximum of 10%.

Additions of $Al_2O_3$ in amounts ranging up to about 6% and/or of $B_2O_3$ at levels up to about 8% are particularly useful in enhancing the chemical durability of the glass and/or improving glass stability, the total of those additions not exceeding 8%. Consequently, the preferred inventive glasses will contain about 0.75–6% $Al_2O_3$ and/or about 1–8% $B_2O_3$, the total thereof being a maximum of 8%.

Optional ingredients (including $Al_2O_3$, $B_2O_3$, PbO and SnO) may be present to a total of 35%. For example, MgO, CaO, SrO, and MnO may be included in individual concentrations up to 10% and BaO up to 12%, with the total of those five constituents not exceeding 15%. The level of CaO will preferably be held to a maximum of 5%. The combination of CaO+BaO in the range of 6–15% has been found useful in imparting good chemical durability to the glass without raising the Tg thereof excessively. $Cu_2O$ may be included up to 15%. The combination of MnO and $Cu_2O$ has been observed to reduce the Tg of the glass, while maintaining the good chemical durability thereof. Additions of other compatible oxides and fluoride (F) can be tolerated in amounts not exceeding 5%. $ZrO_2$ has been found to be particularly useful in conferring a uniform white opal coloration to the glasses when included in amounts of about 1–5%. $SiO_2$, if present at all, will not exceed about 4%.

In the preferred compositions the sum of $R_2O+Al_2O_3$ and/or $B_2O_3+ZnO+P_2O_5+PbO+SnO$ will total at least 85%. In more preferred compositions the glasses will consist essentially of 30–55% ZnO, 30–38% $P_2O_5$, 0–4% $Al_2O_3$, 0–10% PbO, 0–10% SnO, and 10–30% $R_2O$, wherein $R_2O$ consists of 3–12% $Li_2O$, 4–18% $Na_2O$, and 0–12% $K_2O$, the sum of those ingredients totalling at least 85%. In the most preferred compositions the glasses will consist essentially of 30–49% ZnO, 30–36% $P_2O_5$, 1–3.5% $Al_2O_3$, 0–10% SnO, and 12–25%

$R_2O$, wherein $R_2O$ consists of at least two alkali metal oxides in the indicated proportions of 3-12% $Li_2O$, 4-13% $Na_2O$, and 0-12% $K_2O$, the sum of those ingredients totalling at least 85%.

Whereas the complete conversion of composition ranges expressed in terms of mole percent to ranges expressed in terms of weight percent is not mathematically possible, the following intervals comprise approximate values of the above ranges in terms of weight percent. Thus, the broad composition area consists essentially of 5-25% $R_2O$, wherein $R_2O$ consists of at least two alkali metal oxides in the indicated proportions of 0-10% $Li_2O$, 0-15% $Na_2O$, and 0-20% $K_2O$, 18-45% ZnO, 30-57% $P_2O_5$, and optionally, up to 55% RO, wherein RO consists of 0-50% PbO and 0-40% SnO. In the preferred compositions 0.75-6% $Al_2O_3$ and/or 1-6% $B_2O_3$ will be included, the total of those components not exceeding about 6%. BaO may be present up to about 16%.

Prior Art

U.S. Pat. No. 3,215,543 describes the production of articles composed of mica particles dispersed in a glassy matrix, the glassy matrix consisting essentially, in mole percent, of 6-20% RO, wherein RO consists of CaO, MgO, and/or ZnO, 22-42.5% $R_2O$, wherein $R_2O$ consists of the alkali metal oxides, 6 to $(16+d/6)\%$ $Al_2O_3$, and $(36-d/6)$ to $(56-d)\%$ $P_2O_5$, where d comprises the percentage of RO. The $Al_2O_3$ content is in excess of that which can be tolerated in the present inventive compositions.

U.S. Pat. No. 3,248,234, presents glasses consisting essentially, in mole percent, of 25-58% alkali metal oxide, 29-68% $P_2O_5$, 2-20% $Al_2O_3$, 0-10% $B_2O_3$, and 0-20% CaO and/or MgO and/or ZnO. There is no requirement that at least two alkali metal oxides be included. The total alkali metal oxide present in all of the working examples greatly exceeded 35%. ZnO appears in only one working example, and there at a level of only 6%. The glasses exhibit solubility in water; the present inventive glasses are resistant thereto.

U.S. Pat. No. 3,407,091 discloses the preparation of sealing glasses consisting essentially, in weight percent, of 4-27% $Na_2O$ and/or $K_2O$, 4-30% ZnO, 2-10% $Al_2O_3$, and 60-67% $P_2O_5$. The $P_2O_5$ concentration is greater than that which is permissible in the present inventive glasses.

U.S. Pat. No. 3,481,749 sets forth glasses suitable as lubricants for use, for example, in the extrusion of metallic bodies at elevated temperatures. That application requires a glass readily attacked by water to permit easy removal from the body by washing after use. The glasses consisted essentially, in molar percent, of 9-33% alkali metal oxide, 16-20% BaO, CaO, MgO, PbO, and/or ZnO, 10-20% $Al_2O_3$, and 29-61% $P_2O_5$. The $Al_2O_3$ level is far above that found operable in the present invention. Moreover, the poor chemical durability of the glasses would render them useless in the applications envisioned for the present inventive glasses.

U.S. Pat. No. 3,732,181 was reviewed in some detail above. $Al_2O_3$ is nowhere mentioned as a glass component and all of the working examples have compositions quite far removed from the ranges of the present invention.

U.S. Pat. No. 3,885,973 teaches the preparation of glasses having compositions consisting essentially, in mole percent, of 5-25% $Li_2O$, 5-30% ZnO, 58-76% $P_2O_5$, and 0-10% alkaline earth oxides, and may contain up to 5% by weight water. There is no requirement for the presence of at least two alkali metal oxides and no working example contained two, and the concentrations of $P_2O_5$ far exceed those found operable in the instant inventive glasses.

U.S. Pat. No. 3,926,649 describes the production of glasses having compositions consisting essentially, in mole percent, of 72.5-77.5% $P_2O_5+B_2O_3$ and 22.5-27.5% alkali metal oxides, alkaline earth metal oxides, and ZnO, and may contain up to 5% by weight water. There is no requirement for the inclusion of at least two alkali metal oxides and in all of the working examples the $P_2O_5$ content is much higher than can be tolerated in glasses of the present invention.

U.S. Pat. No. 3,935,018 discloses the formulation of glasses having compositions consisting essentially, in mole percent, of 1.2-3.5% $B_2O_3$, 50-72% $P_2O_5$, 0-30% PbO, 0-5% transition metal oxides, and the remainder alkali metal oxides, alkaline earth metal oxides, and/or ZnO, and may contain up to 5% by weight water. No working example contained ZnO and the $P_2O_5$ level is greater than that found operable in the present inventive glasses.

U.S. Pat. No. 3,979,322 sets forth glasses suitable for laser applications consisting essentially, in mole percent, of 1-30% alkali metal oxides, 20-45% group II metal oxides, 0.1-25% $Nd_2O_3$, 35-49% $P_2O_5$, and 0-27% $Al_2O_3$, $B_2O_3$, $Nb_2O_5$, and/or PbO. There is no requirement that at least two alkali metal oxides be present and none of the working examples contained two. Moreover, the $P_2O_5$ contents and, where present, the alkaline earth metal oxides concentrations in the working examples were substantially in excess of those delimited in the glasses of the instant invention.

U.S. Pat. No. 4,026,714 discusses the production of glasses exhibiting anti-misting properties, the phenomenon of anti-misting being the result of the glasses being slightly hygroscopic. Such glasses would not be suitable for the purposes of the present invention. The glasses consisted essentially, in mole percent, of 4-30% alkali metal oxides, alkaline earth metal oxides, or ZnO, 1-12% PbO, 3.5-12% $B_2O_3$ and/or $SiO_2$ and/or $Al_2O_3$, and 52-72% $P_2O_5$. The $P_2O_5$ content is far in excess of that which is operable in the present invention.

U.S. Pat. No. 4,060,422 relates to sealing glasses for glass lasers consisting essentially, in mole percent, of 4-12% $Li_2O$, 5-25% PbO, 15-35% ZnO, 1-4% $Al_2O_3$, 2-10% $V_2O_5$, and 45-65% $P_2O_5$. The $P_2O_5$ level is higher than is suitable in the present inventive glasses.

U.S. Pat. No. 4,229,220 is concerned with glasses useful in coating glass laser discs consisting essentially, in mole percent of 0-20% $Li_2O$, 0-17% $Na_2O$, 8-20% $Li_2O+Na_2O$, 7-28% CuO, 4-10% $Al_2O_3$, 51-59% $P_2O_5$, 0-8% $B_2O_3$, 0-2% ZnO, 0-15% BaO, and 0-13% $V_2O_5$. The concentration of $P_2O_5$ exceeds that found operable in the present inventive glasses.

U.S. Pat. No. 4,239,645 is drawn to laser glasses consisting essentially, in mole percent, of 10-25% $R_2O$, wherein $R_2O$ consists of 0-25% $Li_2O$, 0-25% $Na_2O$, and 0-8% $K_2O$, 5-15% RO, wherein RO consists of 0-15% BaO, 0-15% CaO, 0-15% MgO, 0-15% SrO, and 0-15% ZnO, 1-15% $Al_2O_3$, 55-70% $P_2O_5$, 0.01-5% $Nd_2O_3$, 0-5% $Y_2O_3$, 0-5% $La_2O_3$, 0-5% $GeO_2$, 0-5% $CeO_2$, 0-3% $Nb_2O_5$, 0-3% $MnO_2$, 0-2% $Ta_2O_5$, and 0-1% $Sb_2O_3$. The $P_2O_5$ content is greater than that specified in the present invention.

U.S. Pat. No. 4,248,732 refers to laser glasses consisting essentially, in mole percent, of 5-40% alkali metal oxides, 5-30% RO, wherein RO is at least one oxide selected from the group BaO, BeO, CaO, MgO, SrO, and ZnO, 0.01-15% $R_2O_3$, where $R_2O_3$ is at least one oxide selected from the group $Al_2O_3$, $B_2O_3$, $Er_2O_3$, $La_2O_3$, $Tm_2O_3$, and $Y_2O_3$, 0.01-7% $Nd_2O_3$, 35-65% $P_2O_5$, and 0.1-10% by weight of a solarization inhibiting oxide selected from the group of $CeO_2$, $Nb_2O_5$, $Sb_2O_3$, $SiO_2$, and $TiO_2$. Such ranges and the components making up those ranges are far broader and more diverse than can be tolerated in the present inventive glasses. Even excluding the required inclusion of $Nd_2O_3$ and the solarization inhibitor, none of the 29 working examples provided in the patent had a composition coming within the ranges delimited in the present invention.

U.S. Pat. No. 4,391,915 records glasses from which optical components can be pressed consisting essentially, in weight percent, of 5-20% $K_2O$, 0-3% $Li_2O$, 8-15% BaO, 0-6% MgO, 0-18% PbO, 4.5-9% ZnO, 3.5-9% $Al_2O_3$, 0-3% $B_2O_3$, 0-1% $SiO_2$, 0-2% $TiO_2$, 45-55% $P_2O_5$. The content of BaO exceeds that which can be tolerated in the present inventive glasses. Moreover, the level of $P_2O_5$ in mole percent in all of the working examples provided in the patent was higher than the maximum permitted in the present inventive glasses.

U.S. Pat. No. 4,439,530 reports optical glasses basically consisting essentially, in weight percent, of 3-30% $R_2O$, wherein $R_2O$ consists of 0-30% $Na_2O$+0-30% $K_2O$, 8-65% PbO, 1-45% $Ta_2O_5$, and 18-38% $P_2O_5$. The patent also recites a large number of optional ingredients in varying amounts including 0-3% $Al_2O_3$ and 0-25% ZnO. $Ta_2O_5$ comprises no part of the present inventive glasses and, even ignoring the presence of $Ta_2O_5$, none of the working examples provided in the patent had a composition within the ranges required in the present inventive glasses.

U.S. Pat. No. 4,544,974 recites glass compositions suitable for bonding metals or metal oxides into a composite structure. The glasses consist essentially, in mole percent, of 10-40% alkali metal or alkaline earth metal oxide, 0-25% CuO or ZnO, 5-15% $Al_2O_3$, 0-25% $B_2O_3$, 0-30% $SiO_2$, and 10-35% $P_2O_5$, wherein at least one of $B_2O_3$, CuO, $SiO_2$, and ZnO is present. $B_2O_3$ and $SiO_2$ are not required constituents in the present inventive glasses; the $Al_2O_3$ content of the glasses disclosed in the patent is higher than desired in the present inventive glasses; and, even ignoring the high $Al_2O_3$ levels, the working examples provided in the patent had compositions outside the ranges demanded in the present inventive glasses.

"Oxide Glasses of Very Low Softening Point. Parts 1 and 2. Preparation and Properties of Some Lead Phosphate Glasses," N. H. Ray et al., *Glass Technology* 14, No. 2, pages 50-59, April 1973, provides an extensive study of a wide variety of phosphate-based glasses, including $R_2O$-ZnO-$P_2O_5$ glasses. However, none of the glasses had a composition coming within the ranges of the present invention.

Description of Preferred Embodiments

Table I records a number of glass compositions, expressed in terms of mole percent on the oxide basis, operable in the present invention. Table IA reports the same compositions, but wherein the values of the individual components have been converted to weight percent. The actual batch ingredients for the glasses can comprise any materials, either the oxides or other compounds, which, upon being melted together, will be converted into the desired oxides in the proper proportions. For example, $Li_2CO_3$ is conveniently employed as the source of $Li_2O$. Because it is not known with which cation it is combined and because the amount included was relatively quite small, the fluoride content is simply recorded in percent in addition to the base glass composition.

The batch materials were compounded, ballmilled together to aid in securing a homogeneous melt, and then charged into silica crucibles. After placing lids thereon, the crucibles were introduced into a furnace operating at about 1000° C. and maintained at that temperature for about 3 hours. Each melt was poured into a steel mold to produce a rectangular glass slab having dimensions of about 8"×4"×0.5" and the glass slab annealed overnight at 300° C.

Rectangular tab-shaped pieces weighing about 30-40 grams were cut from the slabs and heat treated in cups of aluminum foil to temperatures within the range of 350°-450° C., and glass cane was hand drawn from each cup to obtain a close approximation of the working temperature of the glass.

Whereas the above description reflects laboratory melting and forming practice only, it will be appreciated that the recited compositions are capable of being melted in large scale melting units and shaped into desired configurations utilizing forming techniques conventional in the glassmaking art.

TABLE I

| (Mole %) | | | | | | | |
|---|---|---|---|---|---|---|---|
| | 1 | 2 | 3 | 4 | 5 | 6 | 7 |
| $P_2O_5$ | 35.4 | 32.0 | 35.0 | 32.0 | 32.0 | 34.0 | 35.0 |
| $Al_2O_3$ | 3.1 | 2.0 | 2.0 | 1.0 | 2.0 | 3.3 | 2.0 |
| $Li_2O$ | 7.8 | 9.0 | 10.0 | 10.0 | 10.0 | 9.9 | 10.0 |
| $Na_2O$ | 7.8 | 9.0 | 10.0 | 10.0 | 10.0 | 9.9 | 10.0 |
| ZnO | 45.9 | 48.0 | 43.0 | 47.0 | 46.0 | 43.0 | 38.0 |
| CaO | — | — | — | — | — | — | 3.0 |
| MgO | — | — | — | — | — | — | 2.0 |
| $F_2$ | — | — | — | — | — | 2.0 | — |

| | 8 | 9 | 10 | 11 | 12 | 13 |
|---|---|---|---|---|---|---|
| $P_2O_5$ | 35.0 | 35.0 | 33.0 | 33.0 | 33.0 | 31.0 |
| $Al_2O_3$ | 2.0 | 2.0 | 2.0 | 2.0 | 3.0 | 2.0 |
| $Li_2O$ | 7.0 | 22.0 | 10.0 | 10.0 | 5.0 | — |
| $Na_2O$ | 7.0 | — | 10.0 | — | 7.0 | 10.0 |
| ZnO | 39.0 | 33.0 | 45.0 | 45.0 | 45.0 | 47.0 |
| $Cu_2O$ | 10.0 | — | — | — | — | — |
| CaO | — | 8.0 | — | — | — | — |
| $K_2O$ | — | — | — | 10.0 | 7.0 | 10.0 |

| | 14 | 15 | 16 | 17 | 18 | 19 |
|---|---|---|---|---|---|---|
| $P_2O_5$ | 33.0 | 33.0 | 32.0 | 33.0 | 33.0 | 33.0 |
| $Al_2O_3$ | 2.0 | 2.0 | — | — | 2.0 | 2.0 |
| $Li_2O$ | 8.0 | 8.0 | 9.0 | 10.0 | 6.0 | 8.0 |
| $Na_2O$ | 12.0 | 12.0 | 9.0 | 10.0 | 7.0 | 12.0 |
| ZnO | 25.0 | 30.0 | 50.0 | 43.0 | 45.0 | 25.0 |
| $K_2O$ | — | — | — | — | 7.0 | — |
| PbO | 20.0 | — | — | — | — | — |
| SnO | — | 15.0 | — | — | — | 20.0 |
| $B_2O_3$ | — | — | — | 4.0 | — | — |

| | 20 | 21 | 22 | 23 | 24 | 25 | 26 |
|---|---|---|---|---|---|---|---|
| $P_2O_5$ | 33.0 | 33.0 | 33.0 | 33.0 | 33.0 | 33.0 | 33.0 |
| $Al_2O_3$ | 2.0 | 2.0 | 2.0 | 2.0 | 2.0 | — | 2.0 |
| $Li_2O$ | — | 10.0 | — | 6.0 | 4.0 | 6.0 | 6.0 |
| $Na_2O$ | 17.0 | 10.0 | 8.0 | 6.0 | 10.0 | 8.0 | 7.0 |
| ZnO | 40.0 | 35.0 | 40.0 | 46.0 | 41.0 | 45.0 | 41.0 |
| $K_2O$ | 8.0 | 10.0 | 17.0 | 7.0 | 10.0 | 8.0 | 7.0 |
| MnO | — | — | — | — | — | — | 4.0 |

| | 27 | 28 | 29 | 30 | 31 | 32 |
|---|---|---|---|---|---|---|
| $P_2O_5$ | 31.6 | 33.0 | 36.0 | 35.0 | 33.0 | 35.0 |
| $Al_2O_3$ | 1.9 | 2.0 | 2.0 | 2.0 | 2.0 | 2.0 |
| $Li_2O$ | 9.8 | 6.0 | 8.0 | 8.0 | 7.0 | 9.0 |

TABLE I-continued

|  |  |  |  |  |  |  |
|---|---|---|---|---|---|---|
| Na2O | 9.6 | 7.0 | 15.0 | 15.0 | 16.0 | 13.0 |
| ZnO | 33.5 | 41.0 | 24.0 | 24.0 | 27.0 | 27.0 |
| SnO | 9.7 | 4.0 | — | 5.0 | 5.0 | — |
| ZrO2 | 3.9 | — | — | — | — | — |
| K2O | — | 7.0 | 5.0 | 5.0 | 5.0 | 5.0 |
| CaO | — | — | 5.0 | 3.0 | 3.0 | 5.0 |
| BaO | — | — | 5.0 | 3.0 | 2.0 | 4.0 |

|  | 33 | 34 | 35 | 36 | 37 | 38 |
|---|---|---|---|---|---|---|
| P2O5 | 34.0 | 36.0 | 35.0 | 33.0 | 35.0 | 37.0 |
| Al2O3 | 2.0 | 2.0 | 2.0 | 2.0 | 2.0 | 2.0 |
| Li2O | 6.0 | 8.0 | 8.0 | 7.0 | 9.0 | 9.0 |
| Na2O | 16.0 | 15.0 | 15.0 | 16.0 | 13.0 | 9.0 |
| ZnO | 27.0 | 24.0 | 24.0 | 27.0 | 27.0 | 43.0 |
| SnO | — | — | 5.0 | 5.0 | — | — |
| K2O | 5.0 | 5.0 | 5.0 | 5.0 | 5.0 | — |
| CaO | 4.0 | — | — | — | — | — |
| BaO | 4.0 | 10.0 | 6.0 | 5.0 | 9.0 | — |
| SiO2 | 2.0 | — | — | — | — | — |

|  | 39 | 40 | 41 | 42 | 43 | 44 |
|---|---|---|---|---|---|---|
| P2O5 | 38.0 | 41.0 | 33.0 | 36.0 | 33.0 | 33.0 |
| Al2O3 | 2.0 | 2.0 | 2.0 | 2.0 | 2.0 | 2.0 |
| Li2O | 22.0 | 9.0 | 7.0 | 7.0 | 7.0 | 8.0 |
| Na2O | — | 9.0 | 16.0 | 16.0 | 16.0 | 12.0 |
| ZnO | 38.0 | 39.0 | 21.0 | 21.0 | 18.0 | 15.0 |
| K2O | — | — | 5.0 | 5.0 | 5.0 | — |
| BaO | — | — | 16.0 | 13.0 | 19.0 | — |
| PbO | — | — | — | — | — | 30.0 |

|  | 1 | 2 | 3 | 4 | 5 | 6 | 7 |
|---|---|---|---|---|---|---|---|
| P2O5 | 51.3 | 47.9 | 51.8 | 48.4 | 48.3 | 50.6 | 52.7 |
| Al2O3 | 3.3 | 2.1 | 2.1 | 1.1 | 2.1 | 3.5 | 2.1 |
| Li2O | 2.4 | 2.8 | 3.1 | 3.2 | 3.2 | 3.1 | 3.2 |
| Na2O | 4.9 | 5.9 | 6.5 | 6.6 | 6.6 | 6.3 | 6.6 |
| ZnO | 38.1 | 41.2 | 36.5 | 40.7 | 39.8 | 36.5 | 32.8 |
| CaO | — | — | — | — | — | — | 1.8 |
| MgO | — | — | — | — | — | — | 0.8 |
| F2 | — | — | — | — | — | 1.7 | — |

TABLE IA (Weight %)

|  | 8 | 9 | 10 | 11 | 12 | 13 |
|---|---|---|---|---|---|---|
| P2O5 | 47.7 | 55.5 | 49.5 | 47.9 | 47.3 | 44.1 |
| Al2O3 | 1.9 | 2.2 | 2.2 | 2.1 | 3.1 | 2.0 |
| Li2O | 2.0 | 7.4 | 3.2 | 3.1 | 1.5 | — |
| Na2O | 4.9 | — | 6.5 | — | 4.4 | 6.2 |
| ZnO | 30.5 | 29.9 | 38.6 | 37.4 | 37.0 | 38.3 |
| Cu2O | 13.7 | — | — | — | — | — |
| CaO | — | 5.0 | — | — | — | — |
| K2O | — | — | — | 9.6 | 6.6 | 9.4 |

|  | 14 | 15 | 16 | 17 | 18 | 19 |
|---|---|---|---|---|---|---|
| P2O5 | 37.9 | 45.4 | 48.1 | 49.9 | 47.3 | 44.3 |
| Al2O3 | 1.6 | 1.9 | — | — | 2.1 | 1.9 |
| Li2O | 1.9 | 2.3 | 2.9 | 3.2 | 2.4 | 2.3 |
| Na2O | 6.0 | 7.2 | 5.9 | 6.6 | 4.4 | 7.0 |
| ZnO | 16.4 | 23.6 | 43.1 | 37.3 | 37.1 | 19.2 |
| K2O | — | — | — | — | 6.7 | — |
| PbO | 36.1 | — | — | — | — | — |
| SnO | — | 19.5 | — | — | — | 25.4 |
| B2O3 | — | — | — | 3.0 | — | — |

|  | 20 | 21 | 22 | 23 | 24 | 25 | 26 |
|---|---|---|---|---|---|---|---|
| P2O5 | 47.2 | 48.9 | 45.8 | 47.8 | 47.3 | 48.0 | 48.0 |
| Al2O3 | 2.0 | 2.1 | 2.0 | 2.0 | 2.0 | — | 2.0 |
| Li2O | — | 3.1 | — | 1.8 | 1.2 | 1.8 | 1.8 |
| Na2O | 10.6 | 6.5 | 4.9 | 4.4 | 6.3 | 5.1 | 4.4 |
| ZnO | 32.7 | 29.7 | 31.7 | 37.3 | 33.7 | 37.4 | 34.1 |
| K2O | 7.5 | 9.8 | 15.6 | 6.7 | 9.5 | 7.7 | 6.7 |
| MnO | — | — | — | — | — | — | 2.9 |

|  | 27 | 28 | 29 | 30 | 31 | 32 |
|---|---|---|---|---|---|---|

TABLE IA-continued

|  |  |  |  |  |  |  |
|---|---|---|---|---|---|---|
| P2O5 | 44.5 | 46.7 | 51.4 | 49.4 | 46.6 | 50.7 |
| Al2O3 | 1.9 | 2.0 | 2.0 | 2.0 | 2.0 | 2.0 |
| Li2O | 2.9 | 1.8 | 2.4 | 2.4 | 2.1 | 2.7 |
| Na2O | 5.9 | 4.2 | 9.3 | 9.2 | 9.8 | 8.3 |
| ZnO | 27.1 | 33.3 | 19.6 | 19.4 | 21.9 | 22.4 |
| SnO | 12.9 | 5.4 | — | 6.8 | 6.7 | — |
| ZrO2 | 4.8 | — | — | — | — | — |
| K2O | — | 6.5 | 4.7 | 4.7 | 4.7 | 4.8 |
| CaO | — | — | 2.8 | 1.7 | 1.7 | 2.9 |
| BaO | — | — | 7.7 | 4.6 | 4.6 | 6.2 |

|  | 33 | 34 | 35 | 36 | 37 | 38 |
|---|---|---|---|---|---|---|
| P2O5 | 49.2 | 49.0 | 48.0 | 46.0 | 48.3 | 53.7 |
| Al2O3 | 2.0 | 1.9 | 1.9 | 2.0 | 1.9 | 2.0 |
| Li2O | 1.8 | 2.3 | 2.3 | 2.1 | 2.6 | 2.8 |
| Na2O | 10.1 | 8.9 | 9.0 | 9.7 | 7.9 | 5.7 |
| ZnO | 22.4 | 18.7 | 18.8 | 21.6 | 21.4 | 35.8 |
| SnO | — | — | 6.5 | 6.6 | — | — |
| K2O | 4.8 | 4.5 | 4.5 | 4.6 | 4.6 | — |
| CaO | 2.2 | — | — | — | — | — |
| BaO | 6.2 | 14.7 | 8.9 | 7.5 | 13.4 | — |
| SiO2 | 1.2 | — | — | — | — | — |

|  | 39 | 40 | 41 | 42 | 43 | 44 |
|---|---|---|---|---|---|---|
| P2O5 | 49.5 | 53.9 | 43.8 | 47.8 | 42.9 | 34.0 |
| Al2O3 | 2.2 | 2.2 | 1.9 | 1.9 | 1.8 | 1.5 |
| Li2O | 9.3 | 3.9 | 2.0 | 2.0 | 1.9 | 1.7 |
| Na2O | 6.0 | 5.8 | 9.2 | 9.3 | 9.0 | 5.4 |
| ZnO | 33.0 | 34.2 | 16.0 | 16.0 | 13.4 | 8.8 |
| K2O | — | — | 4.4 | 4.4 | 4.3 | — |
| BaO | — | — | 22.9 | 18.6 | 26.6 | — |
| PbO | — | — | — | — | — | 48.5 |

Samples having the approximate dimensions of 35×25×15 mm were cut from each glass slab and then ground and polished for testing the chemical durability thereof. In one test each sample was carefully weighed and then immersed into a bath of boiling water. After a residence time of six hours, the sample was removed from the bath, dried in the ambient environment, and thereafter weighed to determine any loss of weight by the sample. In a second test each sample was carefully weighed and then immersed into a bath operating at 75° C. of a 0.3% by weight aqueous solution of SUPER SOILAX detergent marketed by Economics Laboratories, St. Paul, Minn., the solution exhibiting a pH of about 10. After a dwell period of 24 hours, the sample was removed from the bath, dried in the ambient environment, and reweighed to measure any weight loss. In a third test each sample was carefully weighed and then introduced into an autoclave. The temperature within the autoclave was raised to 125° C. and a steam atmosphere of 33 psi generated. After an exposure of four hours, the sample was removed from the autoclave, dried in the ambient environment, and again weighed to determine any loss in weight. The Tg of the glass was measured utilizing standard differential scanning calorimetry techniques.

Table II reports the percent weight loss in the boiling water test ($H_2O$), the percent weight loss in the SUPER SOILAX test (SUPER), the percent weight loss in the steam test (Steam), the Tg of the glass in °C., and the working temperature of the glass in °C. as determined by pulling cane (Pull). In certain instances, the samples exhibited a frosted appearance after exposure to the steam test. That phenomenon is noted by the designation (Fr). One example crystallized (Cryst) during the pull test.

TABLE II

|  | 1 | 2 | 3 | 4 | 5 | 6 | 7 |
|---|---|---|---|---|---|---|---|
| H2O | — | 0.00 | 0.02 | 0.02 | 0.00 | 0.00 | 0.00 |

TABLE II-continued

| | | | | | | | |
|---|---|---|---|---|---|---|---|
| SUPER | 0.00 | 0.05 | 0.83 | — | — | 0.09 | 1.8 |
| Tg | 370 | 355 | — | — | — | 350 | 354 |
| Pull | — | 450 | 425 | 425 | 425 | 425 | 425 |

| | 8 | 9 | 10 | 11 | 12 | 13 |
|---|---|---|---|---|---|---|
| $H_2O$ | 0.00 | 0.02 | 0.00 | 0.02 | 0.00 | 0.00 |
| SUPER | 0.03 | 1.35 | 0.05 | 0.06 | — | 0.09 |
| Steam | — | — | — | 0.00Fr | 0.00Fr | 0.05 |
| Tg | 333 | 369 | 343 | 358 | — | 366 |
| Pull | 430 | 450 | 430 | 450 | 450 | 450 |

| | 14 | 15 | 16 | 17 | 18 | 19 |
|---|---|---|---|---|---|---|
| $H_2O$ | — | — | 0.05 | 0.00 | 0.00 | 0.00 |
| SUPER | 0.05 | 0.08 | — | — | — | — |
| Steam | — | — | — | — | 0.03 | 0.02Fr |
| Tg | 323 | — | — | — | 335 | — |
| Pull | — | 410 | 425 | 425 | 430 | 375 |

| | 20 | 21 | 22 | 23 | 24 | 25 | 26 |
|---|---|---|---|---|---|---|---|
| $H_2O$ | 0.03 | 0.00 | 0.00 | 0.00 | 0.00 | 0.00 | 0.00 |
| SUPER | 2.0 | 3.1 | — | 0.11 | — | — | — |
| Steam | 0.00 | 0.15Fr | 0.32Fr | 0.00 | 0.03 | 0.41 | 0.00 |
| Pull | 430 | 415 | 430 | 430 | 415 | 400 | 435 |

| | 27 | 28 | 29 | 30 | 31 | 32 |
|---|---|---|---|---|---|---|
| $H_2O$ | 0.00 | 0.00 | 0.051 | 0.029 | 0.00 | 0.00 |
| SUPER | — | 0.31 | — | — | 0.54 | — |
| Steam | — | 0.00 | — | — | — | — |
| Tg | 313 | 330 | — | — | 338 | — |
| Pull | — | 425 | 435 | 430 | 425 | 425 |

| | 33 | 34 | 35 | 36 | 37 | 38 |
|---|---|---|---|---|---|---|
| $H_2O$ | 0.061 | 0.00 | 0.00 | 0.00 | 0.00 | 0.52 |
| SUPER | — | — | — | — | — | — |
| Steam | — | — | — | — | — | — |
| Tg | — | — | — | — | — | — |
| Pull | 420 | 430 | 425 | 425 | 435 | 421 |

| | 39 | 40 | 41 | 42 | 43 | 44 |
|---|---|---|---|---|---|---|
| $H_2O$ | 0.75 | 1.21 | 0.00 | 0.36 | 0.00 | 0.00 |
| SUPER | — | — | — | — | — | — |
| Steam | — | — | — | — | — | 0.09Fr |
| Tg | — | — | — | — | — | — |
| Pull | 425 | 415 | Cryst | Cryst | Cryst | Cryst |

The measures of resistance to attack by water exhibited by Examples 1–37 are very exceptional for phosphate-based glass compositions, and are particularly noteworthy since the glasses demonstrate such low transition and working temperatures. The sharp deterioration in chemical durability occurring in glass compositions ever: slightly outside the ranges prescribed in the inventive glasses is immediately evident with a review of Examples 38–40. Hence, in Example 38 additions of $Al_2O_3$ and/or substitutions of $Cu_2O$ for $R_2O$ and/or ZnO would be required to improve their durability to the level of that exhibited by Example 3 which is lower in $P_2O_5$ content and within the most preferred region of compositions. Example 39 clearly illustrates the need for at least two alkali metal oxides in the glass. In Example 40 the level of $P_2O_5$ is too high. In Examples 41–44 the level of ZnO is too low leading to poor glass stability (readily devitrifies). Example 42 indicates that where the level of ZnO is low and the concentration of $P_2O_5$ is relatively high, not only does the glass exhibit poor stability, but it also demonstrates poor durability.

The high resistance to moisture attack renders the inventive glasses eminently suitable for a wide range of applications including, for example, food service, electronic devices, optical and ophthalmic lenses, and coatings for optical waveguides. Furthermore, because the viscosity relationships exhibited by the inventive glasses at relatively low working temperatures render them capable of being shaped into articles of complex configurations through extrusion, injection molding, and other techniques conventionally employed in the plastic forming art, the range of products for which the inventive glass-ceramics are useful is greatly broadened.

We claim:

1. A glass exhibiting a transition temperature below 450° C., a working temperature below 500° C., and excellent resistance to attack by water and mild aqueous alkaline solutions, said glass consisting essentially, expressed in terms of mole percent on the oxide basis, of at least 65% total of 23–55% ZnO, 28–40% $P_2O_5$, and 10–35% $R_2O$, wherein $R_2O$ consists of at least two alkali metal oxides in the indicated proportions selected from the group consisting of 0–25% $Li_2O$, 0–25% $Na_2O$, and 0–25% $K_2O$, and up to 35% total of optional ingredients in the indicated proportions selected from the group consisting of 0–6% $Al_2O_3$, 0–8% $B_2O_3$, 0–8% $Al_2O_3+B_2O_3$, 0–15% $Cu_2O$, 0–5% F, 0–35% PbO, 0–35% SnO, 0–35% PbO+SnO, 0–5% $ZrO_2$, 0–4% $SiO_2$, and 0–15% MgO+CaO+SrO+BaO+MnO, consisting of 0–10% MgO, 0–10% CaO, 0–10% SrO, 0–12% BaO, and 0–10% MnO.

2. A glass according to claim 1 containing 0.75–6% $Al_2O_3$ and/or 1–8% $B_2O_3$, the total $Al_2O_3+B_2O_3$ not exceeding 8%.

3. A glass according to claim 1 containing 30–55% ZnO, 30–38% $P_2O_5$, 0–4% $Al_2O_3$, 0–10% PbO, 0–10% SnO, and 10–30% $R_2O$, wherein $R_2O$ consists of 3–12% $Li_2O$, 4–18% $Na_2O$, and 0–12% $K_2O$.

4. A glass according to claim 1 containing 0–5% CaO.

5. A glass according to claim 4 containing 6–15% CaO+BaO.

6. A glass according to claim 1 wherein the sum of $R_2O+Al_2O_3$ and/or $B_2O_3+ZnO+P_2O_5+PbO+SnO$ totals at least 85%.

7. A glass according to claim 3 wherein the sum of $R_2O+Al_2O_3+ZnO+P_2O_5+PbO+SnO$ totals at least 85%.

8. A glass according to claim 3 consisting essentially of 12–25% $R_2O$, wherein $R_2O$ consists of at least two alkali metal oxides in the indicated proportions of 3–12% $Li_2O$, 4–13% $Na_2O$, and 0–12% $K_2O$, 30–49% ZnO, 1–3.5% $Al_2O_3$, 30–36% $P_2O_5$, and 0–10% SnO, the sum of $R_2O+Al_2O_3+ZnO+P_2O_5+SnO$ totals at least 85%.

* * * * *